United States Patent
Brassil et al.

(10) Patent No.: US 9,094,817 B2
(45) Date of Patent: Jul. 28, 2015

(54) MOBILE DEVICE LOCATION AUTHENTICATION

(75) Inventors: John T. Brassil, Belle Mead, NJ (US); Pratyusa Kumar Manadhata, Placetaway, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 252 days.

(21) Appl. No.: 13/559,276

(22) Filed: Jul. 26, 2012

(65) Prior Publication Data

US 2014/0031057 A1   Jan. 30, 2014

(51) Int. Cl.
*H04W 24/00* (2009.01)
*H04W 12/00* (2009.01)
*H04L 29/06* (2006.01)

(52) U.S. Cl.
CPC ............. *H04W 12/00* (2013.01); *H04L 63/00* (2013.01)

(58) Field of Classification Search
USPC ............... 455/432.1, 433, 435.1, 436–453, 455/456.1–456.3; 370/329–333
See application file for complete search history.

(56) References Cited

U.S. PATENT DOCUMENTS

| | | | |
|---|---|---|---|
| 6,393,261 B1 * | 5/2002 | Lewis | 455/103 |
| 7,370,077 B2 * | 5/2008 | Pradhan et al. | 709/204 |
| 8,515,434 B1 * | 8/2013 | Narendran et al. | 455/446 |
| 2006/0073840 A1 * | 4/2006 | Akgun et al. | 455/456.3 |
| 2008/0293382 A1 * | 11/2008 | Lubenski et al. | 455/411 |
| 2009/0172397 A1 | 7/2009 | Kim | |
| 2009/0191844 A1 | 7/2009 | Morgan et al. | |
| 2009/0271101 A1 * | 10/2009 | Relyea et al. | 701/118 |
| 2011/0069685 A1 * | 3/2011 | Tofighbakhsh | 370/338 |
| 2011/0269428 A1 | 11/2011 | Morgan et al. | |
| 2012/0201143 A1 * | 8/2012 | Schmidt et al. | 370/241 |

OTHER PUBLICATIONS

Wiliams: "*Airvana and VeriSign Team Up on Femtocell Authentication*"; Jun. 24, 2009; http://www.v3.co.uk/v3-uk/news/1954475/airvana-verisign-team-femtocell-authentication.

* cited by examiner

*Primary Examiner* — Dai A Phuong
(74) *Attorney, Agent, or Firm* — Tarolli, Sundheim, Covell & Tummino LLP

(57) ABSTRACT

An authentication server and corresponding method to authenticate a location of a mobile device at a location system are disclosed. The authentication server includes a data transfer controller to initiate data transfer between the mobile device and the authentication server in response to an indication of communicative coupling of the mobile device to a network via a small cell associated with the location system. The authentication server also includes a network activity monitor to access a location server associated with the location system in response to the indication of the communicative coupling and to monitor an indication of network activity associated with the small cell provided by the location server to authenticate the location of the mobile device at the location system.

16 Claims, 2 Drawing Sheets

US 9,094,817 B2

MOBILE DEVICE LOCATION AUTHENTICATION

BACKGROUND

Location-Based Services (LBS) have emerged as a way to enhance targeted services, applications, and advertising delivery to users. These services allow a wireless service provider to receive location information for a user and exploit the location (such as by monetizing it) to offer highly customizable content to users. Examples of LBS include enhanced 911 (E-911), location-based 411, location-based messaging and/or friend finding, requesting the nearest business or service (e.g., restaurant or gas station), receiving location-based reports (e.g., weather, traffic, local news and events), location-based games, location-based advertisements and discounts, and so on. For example, third-party companies may provide a subscription service, such as requiring that participation be established before a first use.

DETAILED DESCRIPTION

Figure 1:
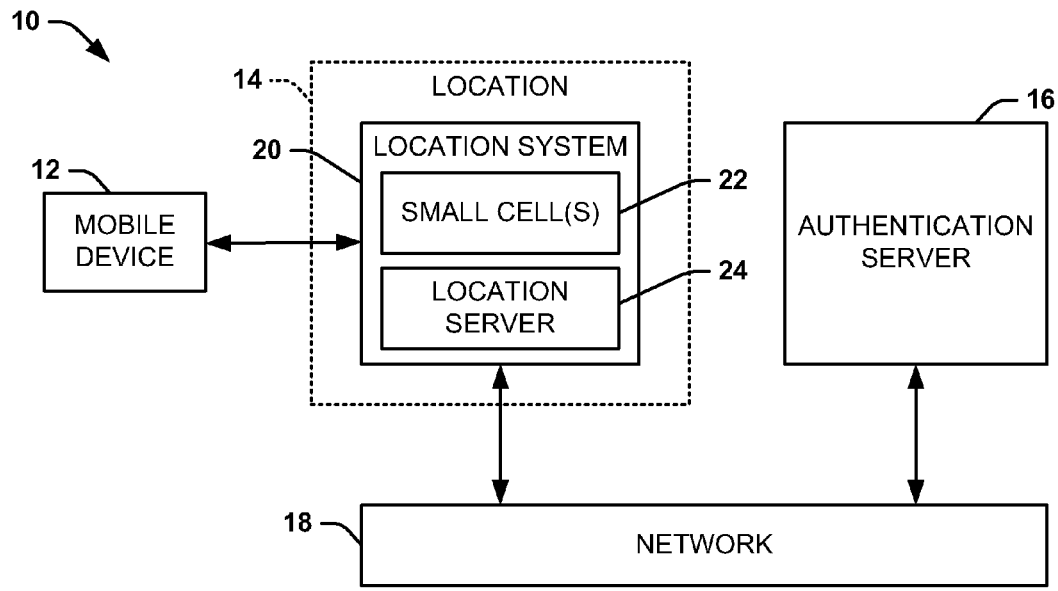
FIG. 1 illustrates an example of a location identification system.

FIG. 1 illustrates an example of a location identification system 10. The location identification system 10 can be implemented to allow a user to identify a location of a mobile device 12 to be at a given location 14, and for an authentication server 16 to authenticate that the user is located at the given location 14. As an example, the authentication server 16 can be implemented by a third party, such as the user's employer or a service provider, to authenticate that the user of the mobile device 12 is actually located at the given location 14, as purported by the user.

The mobile device 12 can be any of a variety of electronic devices capable of connecting to a network 18 via a wireless communications link and that is capable of sending and receiving high-speed data, such as, for example, a desktop computer, a mobile phone, a tablet computer, a notebook computer, a gaming device, a smart phone, or a variety of other types of electronic devices. In the example of FIG. 1, the location 14 can correspond to any of a variety of location types having a wireless access point to the network 18, such as a business, library, office, or a variety of other types of public or private enterprises. The location 14 includes a location system 20 that is associated with the connection of the location 14 to the network 18.

The location system 20 includes at least one small cell 22 that corresponds to a wireless access point to the network 18. As described herein, the small cell(s) 22 can correspond to fixed-position small cellular base stations (e.g., smaller than a cell tower-based system, such as a macrocell) that connect to a wireless service provider's network (e.g., the network 18) to provide extended wireless coverage to a group of users within the limited range of the small cell(s) 22 (e.g., within 5 to 100 meters). As an example, each of the small cell(s) 22 can be configured as a femtocell. The small cell(s) 22 may connect to the network 18 via a Connection Point (CP), such as can enable wireless devices (e.g., including the mobile device 12) in the network 18 to connect to a wired network (e.g., the Internet) using Wi-Fi, Bluetooth, or other wireless standards. The CP can be, for example, an Access Point (AP), a router, or other such device for connecting the small cell(s) 22 to the network 18.

The location identification system 10 can thus allow a user of the mobile device 12 to identify a location of the mobile device 12 as being at the given location 14 based on communicative coupling the mobile device 12 to the network 18 via binding the mobile device 12 to a given one of the small cell(s) 22 at the location 14. As an example, the user can initiate a location input via the mobile device 12 upon binding the mobile device 12 to the given one of the small cell(s) 22. As an example, the location input can be an input provided by the user or automatically by the mobile device 12 to publish a location of the user (e.g., to "check in" using any of a variety of different software applications). The location input can thus be indicative of the communicative coupling of the mobile device 12 to the network 18 via the binding to the respective small cell 22. Based on the limited range of the respective small cell 22 and/or the associated of the respective small cell 22 with the given location 14, the location of the mobile device 12 can be reliably geographically identified.

The indication of the communicative coupling of the mobile device 12 to the network 18 via the binding to the respective small cell 22 can be provided to the authentication server 16 via the network 18. The indication of the communicative coupling can include, for example, data associated with the location system 20, such as a network address (e.g., a uniform resource locator (URL)) of the location system 20. In the example of FIG. 1, the location system 20 includes a location server 24 that can be configured to provide an indication of network activity associated with the small cell(s) 22. The network activity can include statistics associated with network communication traffic passing through the small cell(s) 22, such as bit and/or packet rate, individual communication streams, etc. The location server 24 can host a web server, and can offer a public page with detailed site location information (e.g., GPS, postal address, contact information, etc.). Thus, the indication of the communicative coupling of the mobile device 12 to the network 18 via the binding to the respective small cell 22 can include information regarding the location server 24, such as the site location information and/or other access parameters of the location server 24.

In response to receiving the indication of the communicative coupling (e.g., based on the location input provided via the mobile device 12), the authentication server 16 can access the location server 24 to monitor the network activity associated with the respective small cell 22 to which the mobile device 12 is bound. For example, the authentication server 16 can be configured to initiate data transfer between the mobile device 12 and the authentication server 16 across the network 18 via the respective small cell 22. Therefore, the authentication server 16 can monitor the network activity associated with the respective small cell 22 to identify the data transfer between the mobile device 12 and the authentication server 16. Accordingly, the authentication server 16 can authenticate the location of the mobile device 12 at the location 14 (i.e., as being bound to the respective small cell 22) based on identifying characteristics of the data transfer between the mobile device 12 and the authentication server 16, such as a data transfer pattern or signature.

The data that is to be transferred between the mobile device 12 and the authentication server 16 can be, for example, dummy data that is transferred for the purpose of monitoring associated network characteristics of the respective small cell 22 by the authentication server 16 via the location server 24. For example, the dummy data can be information that does not contain any useful data, but serves to reserve space where real data is nominally present. The authentication server 16 can be configured to control characteristics of the data transfer between the mobile device 12 and the authentication server 16 to create a data transfer signature that can be identified in the data transfer between the mobile device 12 and the authentication server 16. For example, the authentication server 16 can dynamically adjust at least one of a data rate and a packet length of the transferred dummy data. Therefore, the authentication server 16 can monitor the network activity of the respective small cell 22 via the location server 24 to identify the data transfer signature in the network activity, such as corresponding to changes to the respective data rate and/or packet lengths associated with the network activity. Accordingly, upon identifying such corresponding changes in the network activity of the respective small cell 22, the authentication server 16 can authenticate that the mobile device 12 is located at the given location 14 in response to the user purporting that the mobile device 12 is located at the given location 14.

Figure 2:
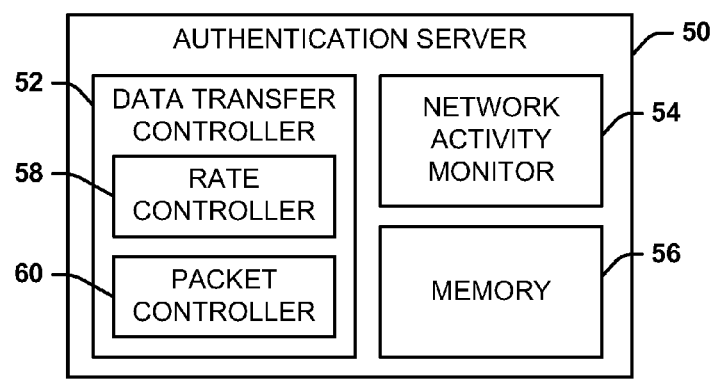
FIG. 2 illustrates an example of an authentication server.

FIG. 2 illustrates an example of an authentication server 50. The authentication server 50 can correspond to the authentication server 16 in the example of FIG. 1. Therefore, reference is to be made to the example of FIG. 1 in the following description of the example of FIG. 2.

The authentication server 50 includes a data transfer controller 52, a network activity monitor 54, and a memory 56. The data transfer controller 52 can be responsive to a location input provided by a mobile device, such as the mobile device 12, to initiate data transfer between the mobile device 12 and the authentication server 50. As an example, the location input can be provided in response to or in addition to the user of the mobile device 12 providing a manual input, such as pressing a button, initiating an application, or implementing a feature of the mobile device (e.g., a GPS receiver). As another example, the location input can be provided automatically in response to the mobile device 12 being bound to the respective small cell 22. In addition, the location input can include security and permission information, such that the location input can be encrypted for receipt by a specific one or more authentication servers 50, and can include data indicating permission or non-permission of the authentication server 50 authenticating the purported location of the mobile device 12 at the give location 14.

In response to receiving the location input, the data transfer controller 52 can initiate the data transfer of data between the mobile device 12 and the authentication server 50 for a predetermined amount of time. The data can be arranged as a file, such as having a size that is sufficiently large for transmission throughout the predetermined amount of time. As an example, the data that is transferred can be configured as dummy data that can reside at the authentication server 50 (e.g., stored in the memory 56), such that the data transfer controller 52 can transmit the dummy data to the mobile device 12 over the network 18 and through the respective small cell 22. For example, the authentication server 50 can provide a network address (e.g., uniform resource locator (URL)) to the mobile device 12 corresponding to a location of the dummy data, such that the mobile device 12 can download the dummy data. As another example, the data can reside at the mobile device 12, such that the data transfer controller 52 can command the mobile device 12 to transmit the data to the authentication server 50 or can otherwise access and download the data from the mobile device 12. As described in greater detail herein, the data transfer controller 52 can control the parameters of the data transfer, such as based on transmission of the data or based on commanding a manner in which the data is transmitted to the authentication server 50 to generate a signature in the data transfer between the mobile device 12 and the authentication server 50.

In the example of FIG. 2, the data transfer controller 52 includes a rate controller 58 and a packet controller 60. The rate controller 58 can be configured to dynamically adjust a data transfer rate of the data that is transmitted between the mobile device 12 and the authentication server 50. Similarly, the packet controller 60 can be configured to select and/or adjust a packet size of the data that is transmitted between the mobile device 12 and the authentication server 50. While the example of FIG. 2 demonstrates that the data transfer controller 52 includes both the rate controller 58 and the packet controller 60, it is to be understood that the data transfer controller 52 could include one of the rate controller 58 and the packet controller 60.

As an example, the rate controller 58 can set an initial data transfer rate for transmission of the data. The rate controller 58 can then dynamically adjust the data transfer rate during the transmission of the data, such as between two fixed transmission rates at each of predetermined intervals. The fixed transmission rates can include the initial data transfer rate, or can be values that are respectively greater and less than the initiate data transfer rate by predetermined values. For example, the rate controller 58 can randomly generate the initial data transfer rate and/or the two fixed transmission rates, such as at each transaction of the data. As yet another example, the rate controller 58 can be configured to modulate the transmission envelope of the data with a raised sinusoid of fixed but randomly generated amplitude and frequency. The data transfer rates that are generated by the rate controller 58 can each be data transfer rates that are less than an available bandwidth for an end-to-end transmission path between the mobile device 12 and the authentication server 50. Therefore, the transmitted packets of the data may be transmitted without delays and can be identified by the network activity monitor 54, as described in greater detail herein.

As an example, the packet controller 60 can set the length of the packets of the data, such that a location server 24 that is capable of identifying the packet lengths of the data can be monitored by the authentication server 50 to identify the packet lengths in the network traffic associated with the respective small cell 22. The packet controller 60 can thus be implemented to construct the packets of the data. For example, the packet controller 60 can select a packet length randomly, such as amongst less often implemented packet lengths (e.g., having sizes between commonly implemented voice and data sizes). As another example, the packet controller 60 can be configured to alternate the construction of the packets of the data between two or more predetermined or random packet sizes, such as in a pattern that is discernible from monitoring the network activity at the location server 24. For example, the packet controller 60 could construct the packets of the data in a sequence of short transfers that each have a distinct and/or unusual packet length from a preselected range of packet lengths. Furthermore, it is to be understood that the rate controller 58 and the packet controller 60 could operate together to construct and transmit the data in a manner that is identifiable at the location server 24.

The network activity monitor 54 can be configured to access the location server 24, such as based on the address and/or characteristic data included in the location input provided by the mobile device 12. The network activity monitor 54 can thus be configured to monitor the network activity of the respective small cell 22 to which the mobile device 12 is supposedly bound, as purported by the location input and/or other indication of communicative coupling, via the location server 24 to detect the data transfer signature. As an example, the location server 24 can be configured to continuously monitor an average bandwidth on an uplink or downlink through the respective small cell 22, such as at each of a given duration interval (e.g., one second). As another example, the location server 24 can be configured to provide indications of packet lengths in each data stream that passes through the respective small cell 22. The location server 24 can thus publish the information regarding the indication of packet length in each stream, such as can be accessible by the network activity monitor 54. The network activity monitor 54 can thus include one or more matching algorithms that are capable of identifying the corresponding changes to data rate and/or corresponding packet lengths in response to the initiated data transfer between the mobile device 12 and the authentication server 50. For example, the network activity monitor 54 can time-align changes in data rate transfer with corresponding changes in a given data stream and/or can identify patterns in packet length in a given data stream.

The network activity monitor 54 can thus authenticate the location identification of the mobile device 12 at the given location 14 based on identifying the respective pattern (e.g., data transfer signature) in the monitored network activity of the respective small cell 22 via the location server 24. The network activity monitor 54 can thus be configured to provide a verification signal to the mobile device 12 and/or to one or more third parties to provide an indication of the authentication of the location information. As another example, the network activity monitor 54 can store data associated with the authentication in the memory 56. For example, the memory 56 can include a stored log of location identifications and/or authentications of the identified locations of the mobile device 12, such as can be accessible by a user of the authentication server 50 or a third party via the network 18. Accordingly, the authentication of the identified location of the mobile device 12 can be implemented in a variety of ways for the third party knowledge and verification of a specific location of the user of the mobile device 12 based on the communicative coupling of the mobile device 12 to a respective small cell 22 at a given location 14.

It is to be understood that the location identification system 10 and the authentication server 50 are not intended to be limited to the examples of FIGS. 1 and 2, respectively. For example, the location identification system 10 can include a plurality of authentication servers 16, such that each of the authentication servers 16 can be configured substantially similar to the authentication server 50 in the example of FIG. 2. Thus, a plurality of third parties can authenticate a location of a given one or more users, such as described herein. For example, the location input can be provided to a specific predetermined one or more of the authentication servers 16, or could be provided to all of the authentication servers 16. As another example, one or more third parties can remotely access a given one of the authentication servers 16, such as via the network 18, to authenticate the location of the user.

Figure 3:
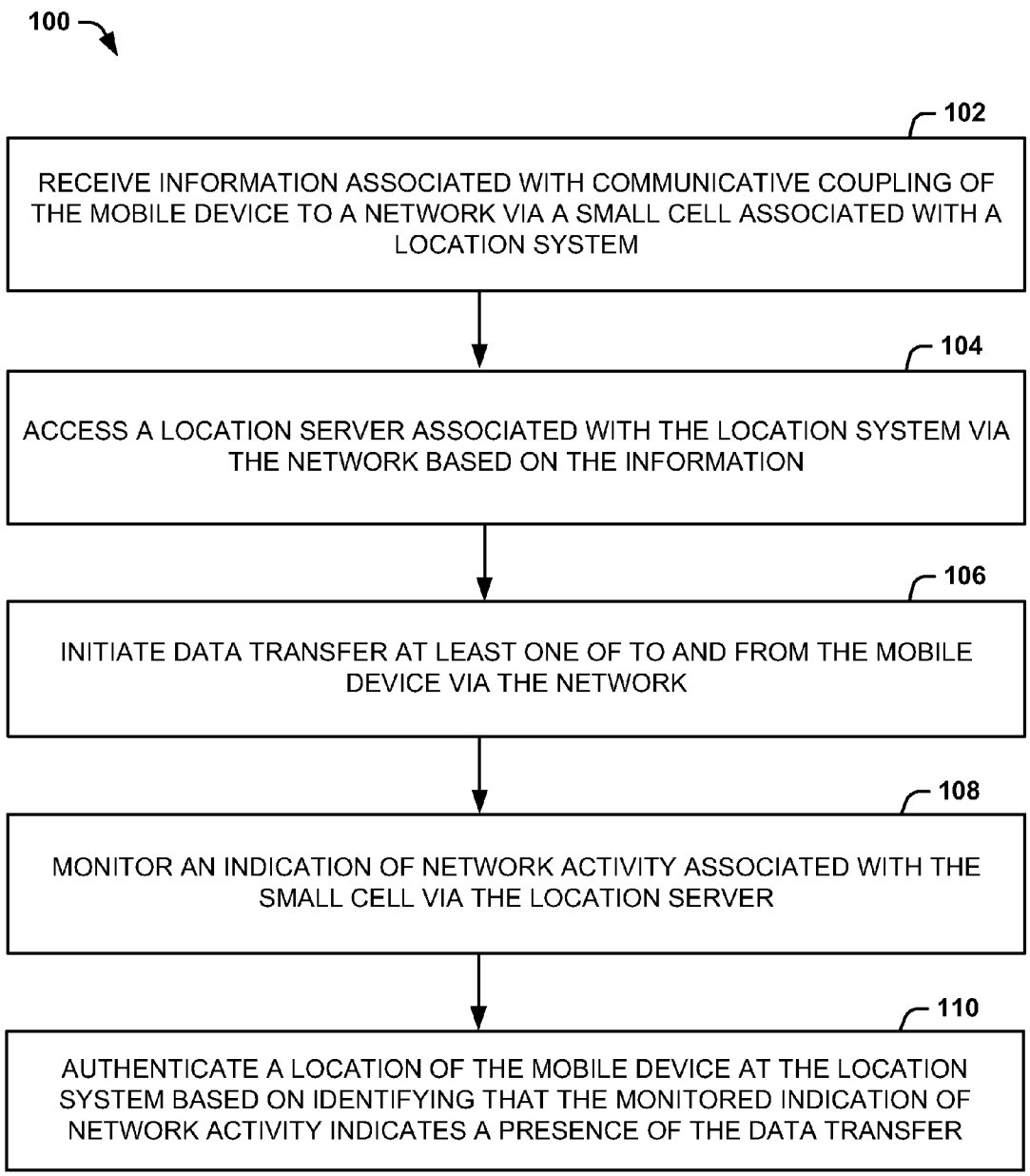
FIG. 3 illustrates an example of a method for authenticating identification of a location of a mobile device.

In view of the foregoing structural and functional features described above, an example method will be better appreciated with reference to FIG. 3. While, for purposes of simplicity of explanation, the method of FIG. 3 is shown and described as executing serially, it is to be understood and appreciated that the method is not limited by the illustrated order, as parts of the method could occur in different orders and/or concurrently from that shown and described herein.

FIG. 3 illustrates an example of a method 100 for authenticating identification of a location of a mobile device (e.g., the mobile device 12). At 102, information associated with communicative coupling of the mobile device to a network (e.g., the network 18) via a small cell (e.g., the small cell 22) associated with a location system (e.g., the location system 20) is received. At 104, a location server (e.g., the location server 24) associated with the location system is accessed via the network based on the information. At 106, data transfer at least one of to and from the mobile device is initiated via the network. At 108, an indication of network activity associated with the small cell is monitored via the location server. At 110, a location of the mobile device at the location system is authenticated based on identifying that the monitored indication of network activity indicates a presence of the data transfer.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

What is claimed is:

1. An authentication server to authenticate a location of a mobile device at a location system, the authentication server comprising:
   a data transfer controller to initiate data transfer comprising a data transfer signature that includes a dynamically adjusted data transfer rate between the mobile device and the authentication server in response to an indication of communicative coupling of the mobile device to a network via a small cell associated with the location system;
   a network activity monitor to access a location server associated with the location system in response to the indication of the communicative coupling and to monitor characteristics of the data transfer as an indication of network activity associated with the small cell provided by the location server to identify changes in the data transfer rate associated with data activity at the small cell corresponding to the data transfer signature to authenticate the location of the mobile device at the location system based on identifying the data transfer signature.

2. The server of claim 1, wherein the data transfer controller is to at least one of select and adjust a packet length associated with the data transfer, the network activity monitor is to monitor the indication of the network activity to identify corresponding packet lengths associated with data activity at the small cell.

3. The server of claim 1, wherein the data transfer controller is to initiate the data transfer associated with a transfer of dummy data for a predetermined duration of time between the mobile device and the authentication server over the network via the small cell in response to the mobile device indicating the communicative coupling.

4. The server of claim 1, wherein the network activity monitor is to monitor the indication of the network activity in response to receiving a location input from the mobile device corresponding to location identification at the location system via the small cell.

5. The server of claim 1, wherein the network activity monitor is to access the location server via the network in response to receiving a network address associated with the location server provided by the mobile device based on the communicative coupling of the mobile device to the network via the small cell.

6. The server of claim 1, further comprising a memory to store data associated with authentication of the location of the mobile device at the location system.

7. The server of claim 1, wherein the characteristics of the data transfer include a packet rate.

8. The server of claim 1, wherein the data transfer controller comprises a packet controller to selectively construct one or more packet lengths for the data transfer in a pattern that is discernible by the network activity monitor at the location server.

9. The server of claim 8, wherein the packet controller selects the one or more packet lengths randomly.

10. The server of claim 8, wherein the packet controller selects the one or more packet lengths to alternate between a plurality of packet lengths.

11. The server of claim 8, wherein the packet controller selects the one or more packet lengths from a set of predetermined packet lengths.

12. A non-transitory computer readable medium comprising instructions that, when executed by a processor, cause an authentication server to:
receive information associated with communicative coupling of the mobile device to a network via a small cell associated with a location system;
access a location server associated with the location system via the network based on the information;
initiate data transfer at least one of to and from the mobile device via the network wherein to initiate the data transfer further comprises to at least one of select a packet length and adjust a packet length associated with the data transfer;
monitor characteristics of the data transfer as an indication of network activity associated with the small cell via the location server to identify packet lengths associated with data activity at the small cell corresponding to a data transfer signature of the mobile device; and authenticate a location of the mobile device at the location system based on identifying that the monitored indication of network activity indicates a presence of the data transfer based on the data transfer signature.

13. The non-transitory computer readable medium of claim 12, wherein to initiate the data transfer further comprises to dynamically adjust a data transfer rate associated with the data transfer, and wherein to monitor the indication of network activity further comprises to monitor the indication of the network activity to identify corresponding changes in a data transfer rate associated with data activity at the small cell.

14. The non-transitory computer readable medium of claim 12, wherein to initiate the data transfer further comprises initiate data transfer of dummy data for a predetermined duration of time between the mobile device and the authentication server over the network via the small cell.

15. An authentication server to authenticate a location of a mobile device at a location system, the authentication server comprising:
a data transfer controller to initiate data transfer comprising a data transfer signature that includes at least one of a dynamically adjusted data transfer rate and a selected packet length associated with the data transfer between the mobile device and the authentication server in response to a location input indicating communicative coupling of the mobile device to a network via a small cell associated with the location system;
a network activity monitor to access a location server associated with the location system in response to the location input and to monitor characteristics of the data transfer as an indication of network activity associated with the small cell provided by the location server to identify a respective at least one of corresponding changes in the data transfer rate and corresponding packet lengths associated with data activity at the small cell to authenticate the location of the mobile device at the location system based on identifying the data transfer signature in the network activity.

16. The system of claim 15, wherein the data transfer controller is to initiate data transfer associated with a transfer of dummy data for a predetermined duration of time between the mobile device and the authentication server over the network via the small cell in response to the location input.

* * * * *